(12) United States Patent
Stefanovic et al.

(10) Patent No.: US 10,724,545 B2
(45) Date of Patent: Jul. 28, 2020

(54) ELECTRIC CENTRIFUGAL COMPRESSOR OF A TURBINE ENGINE OR AIRCRAFT

(71) Applicant: SAFRAN ELECTRICAL & POWER, Blagnac (FR)

(72) Inventors: Nicolas Stefanovic, Bouloc (FR); Eric Wissemer, Brax (FR); Jacques Deleris, Blagnac (FR); Thierry Fontalbat, Portet Sur Garonne (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 245 days.

(21) Appl. No.: 16/060,407

(22) PCT Filed: Dec. 8, 2016

(86) PCT No.: PCT/FR2016/053260
§ 371 (c)(1),
(2) Date: Jun. 7, 2018

(87) PCT Pub. No.: WO2017/103383
PCT Pub. Date: Jun. 22, 2017

(65) Prior Publication Data
US 2019/0003488 A1  Jan. 3, 2019

(30) Foreign Application Priority Data

Dec. 14, 2015 (FR) ..................... 15 62280

(51) Int. Cl.
*F04D 29/58* (2006.01)
*F04D 17/10* (2006.01)
(Continued)

(52) U.S. Cl.
CPC ......... *F04D 29/5806* (2013.01); *F04D 17/10* (2013.01); *F04D 25/0606* (2013.01);
(Continued)

(58) Field of Classification Search
CPC .... F04D 17/10; F04D 25/0606; F04D 25/082; F04D 29/4213; F04D 29/4226;
(Continued)

(56) References Cited

U.S. PATENT DOCUMENTS 5,350,039 A   9/1994  Voss et al.
7,633,193 B2 * 12/2009 Masoudipour ........... H02K 9/19
310/54
(Continued)

FOREIGN PATENT DOCUMENTS

EP    2409920 A2    1/2012

OTHER PUBLICATIONS

International Search Report and Written Opinion received for PCT Patent Application No. PCT/FR2016/053260, dated Mar. 7, 2017, 11 pages (2 pages of English Translation of International Search Report only).

*Primary Examiner* — Patrick Hamo
*Assistant Examiner* — Joseph S. Herrmann
(74) *Attorney, Agent, or Firm* — Womble Bond Dickinson (US) LLP

(57) ABSTRACT

The invention relates to an electric centrifugal compressor, in particular for a turbine engine or aircraft, including an electric motor, the stator of which is supported by a casing and the rotor of which includes a shaft mounted inside the casing, driving a centrifugal compressor impeller, the casing having a double skin and including two substantially cylindrical, coaxial skins extending around the engine and defining between them an annular section suitable for the circulation of a first cooling air flow, one inlet of which is located at a first longitudinal end of the shaft and an outlet of which is connected to a second longitudinal end of the shaft, which supports the centrifugal compressor impeller, wherein it includes means (J) for collecting a second air flow at the
(Continued)

outlet of the centrifugal compressor impeller, means for channelling the second air flow along the shaft up to the first end, and means for discharging the second air flow out of the casing in order to prevent same from mixing with the first air flow.

18 Claims, 4 Drawing Sheets

(51) Int. Cl.
F04D 25/06 (2006.01)
F04D 29/42 (2006.01)
H02K 5/20 (2006.01)
H02K 9/14 (2006.01)

(52) U.S. Cl.
CPC ........... F04D 29/4213 (2013.01); H02K 5/20 (2013.01); H02K 9/14 (2013.01); *F04D 29/4226* (2013.01)

(58) Field of Classification Search
CPC .. F04D 29/046; F04D 29/5806; F04D 29/051; F04D 29/057; F04D 29/0513; H02K 5/20; H02K 9/14; F16C 17/024; F16C 17/042
USPC .................................................. 417/366, 369
See application file for complete search history.

(56) References Cited

U.S. PATENT DOCUMENTS

| | | | | |
|---|---|---|---|---|
| 7,723,857 | B2 * | 5/2010 | Chen | F01D 3/00 |
| | | | | 290/1 A |
| 7,791,238 | B2 * | 9/2010 | Pal | F04D 25/082 |
| | | | | 310/156.12 |
| 8,931,304 | B2 * | 1/2015 | Beers | B64D 13/00 |
| | | | | 62/510 |
| 2007/0069597 | A1 * | 3/2007 | Taniguchi | F04D 29/057 |
| | | | | 310/90.5 |
| 2011/0243762 | A1 * | 10/2011 | Daikoku | F04D 29/584 |
| | | | | 417/321 |
| 2014/0030070 | A1 | 1/2014 | Beers et al. | |
| 2017/0175748 | A1 * | 6/2017 | Pal | F04D 29/584 |

* cited by examiner

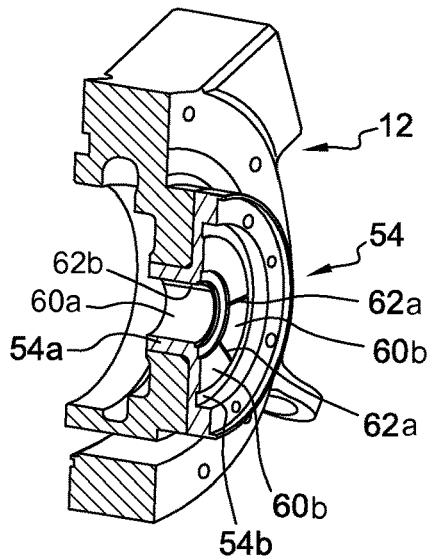
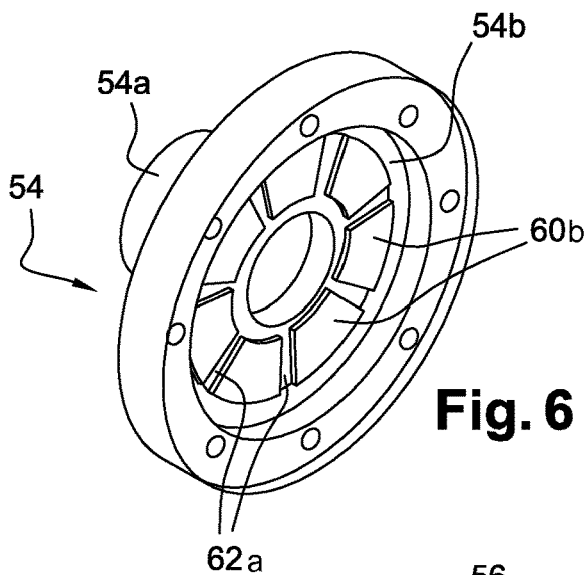
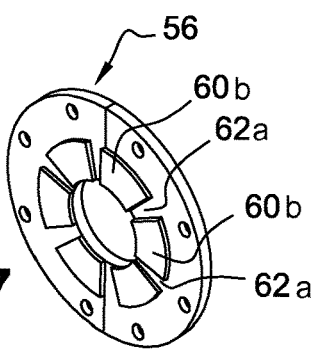
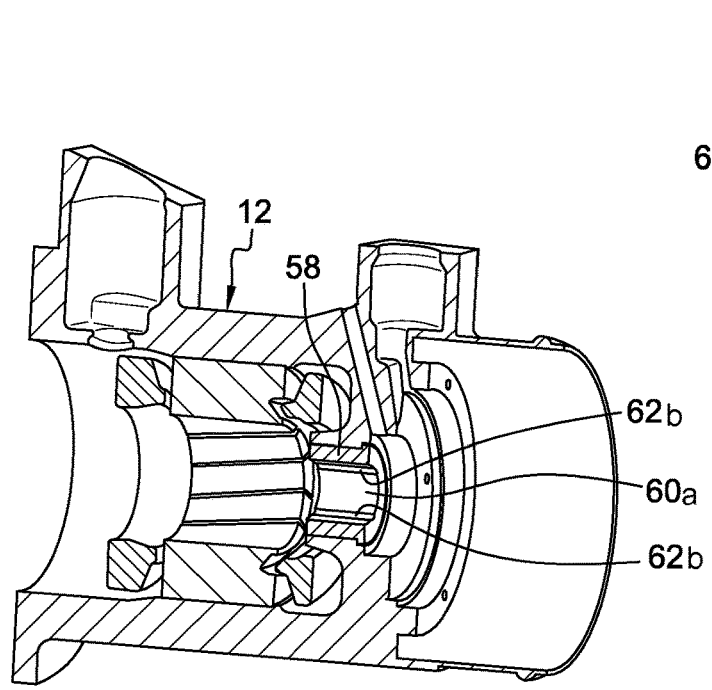
Fig. 5
Fig. 6
Fig. 7
Fig. 8
Fig. 9

ELECTRIC CENTRIFUGAL COMPRESSOR OF A TURBINE ENGINE OR AIRCRAFT

TECHNICAL FIELD

The present invention relates, in particular, to an electric centrifugal compressor of a turbine engine or an aircraft.

STATE OF THE ART

The state of the art includes, in particular, documents U.S. Pat. No. 5,350,039, EP-A2-2 409 920 and US-A1-2014/030070.

A turbine engine features several components and can include an electric centrifugal compressor that generates a flow of compressed air used to power a fuel cell or a pressurised enclosure, such as the cabin of an aircraft.

According to current state of the art, this type of compressor features an electric engine, the stator of which is supported by a casing, and the rotor of which includes a shaft mounted inside the casing, driving the centrifugal compressor impeller.

The rotor of this type of compressor generally rotates at high speed, and cooling is required to evacuate the calorific energy it produces. A known process is to equip such a compressor with a double skin casing. The casing then features two substantially cylindrical and coaxial skins that extend around the engine, defining between them an annular flow path for the cooling air flow. This flow path extends substantially along the entire longitudinal length of the shaft. The shaft features a longitudinal end that supports the compressor impeller, and an opposite longitudinal end that supports a ventilation wheel that forces the air into the air flow path.

The electric centrifugal compressor receives two air flows, a first air flow that travels through the flow path for the cooling of the compressor, and a second air flow that drives the compressor impeller, both air flows being independent.

This type of compressor has disadvantages:
  the shaft of the electric engine features two outlets, one for the main compressor impeller, and the other for the additional ventilation wheel;
  the sizing of this additional wheel depends on the thermal power to discharge; to determine the overall power of the electric engine, one should take into account the power of the compressor added to the additional power required for the ventilation wheel;
  poor sealing occasionally causes both air flows to mix; in particular, the ventilation air flow can be polluted by leaks from the compressor air flow, which translates into heating of the ventilation air flow and generates efficiency losses;
  the cooling of the compressor engine by the first air flow requires significant power from the engine shaft, in particular at high speeds (the efficiency of a compressor impeller is improved at high speeds, whereas the efficiency of the ventilation wheel decreases at 30'000 revs per minute and more, precisely when cooling is the most important).

Regarding the state of the art, in many cases, this type of compressor is cooled by a liquid that circulates in a cooling circuit around the engine. This solution is limiting in aircraft conditions (in particular at low temperature and pressure, where the use of oil is required) and adds to the complexity of the system: the inclusion of a pump to circulate the liquid is required. This solution is widely used in the automotive industry, as the cooling liquid and the pump are generally already available.

PRESENTATION OF THE INVENTION

The invention provides a simple, efficient and cheap solution for at least part of the abovementioned issues.

For this purpose, the invention proposes an electric centrifugal compressor, in particular for a turbine engine or aircraft, comprising an electric engine, the stator of which is supported by a casing and the rotor of which includes a shaft mounted inside said casing, said shaft driving a centrifugal compressor impeller, said casing having a double skin and comprising two substantially cylindrical, coaxial skins extending around said engine and defining between them an annular flow path suitable for a first cooling air flow, one inlet of which is located at a first longitudinal end of said shaft and an outlet of which is connected to a second longitudinal end of said shaft, which supports said centrifugal compressor impeller, characterised in that said compressor includes means for collecting a second air flow at the outlet of said centrifugal compressor impeller, means for channelling said second air flow along said shaft up to said first end, and means for discharging said second air flow out of said casing in order to prevent same from mixing with said first airflow.

The air flow collected at the outlet of the compressor impeller is channelled along the electric engine shaft for cooling purposes. It should therefore be understood that the compressor is cooled by a first air flow circulating between the skins of the casing, and by a second air flow circulating along and around the shaft. This optimised cooling enables to increase the rotational speed of the shaft compared with the previous technique, for example up to 150'000 and even 170'000 revs per minute.

Furthermore, the discharge of the second air flow is controlled, which prevents it from mixing with the first air flow, the latter therefore no longer being heated by the former.

The compressor according to the invention can include one or several of the following features, taken individually or in combination:
  the outlet of said flow path is connected to an air inlet of said centrifugal impeller; it should therefore be understood that the first cooling air flow is channelled to the compressor impeller, and that at the outlet of said impeller, the greater part of the outlet flow provides the main outlet air flow from the compressor, and that a leakage flow forms the second cooling air flow that is evacuated externally in the form of a secondary outlet air flow from the compressor,
  the compressed air coming from the centrifugal compressor is channelled to a (main) compressed air outlet, which is located, for example, in the vicinity of the second end.
  the discharge means forms or includes a (secondary) ventilation air outlet, for example located in the vicinity of the first end,
  said casing is configured to connect the outlet of said flow path to the inlet of said centrifugal impeller,
  the compressor includes bearings, preferentially foil bearings, intersected by said shaft and secured to the casing, whereby said second air flow being intended to circulate between the bearings and said shaft,
  said shaft features a radial collar inserted between two radial walls of the bearings, said discharge means includes a nozzle configured to regulate the flow rate of the second air flow, said casing includes or supports a deflector configured to disperse said second air flow, and shielding is mounted and sealed on the casing, at the level of said first end, and is configured to prevent said first air flow from mixing with said second airflow, The present invention also pertains to a turbine engine, in particular of an aircraft, or to an aircraft, that features at least one compressor such as described above, for example to power a fuel cell or for the pressurisation of an enclosure.

DESCRIPTION OF THE FIGURES

The invention is better understood, and other details, characteristics and advantages of this invention are revealed upon reading the following description, provided as an example and not limited thereto, and with reference to the appended drawings, in which:

FIG. 5 is a schematic perspective view of a longitudinal cross section of a portion of the casing and a bearing for the compressor of FIGS. 1 and 2, FIGS. 6 to 8 are schematic perspective views of the bearings of the compressor of FIGS. 1 and 2, FIG. 9 is a schematic perspective view of a longitudinal cross section of another portion of the casing of the engine and of a bearing for the compressor of FIGS. 1 and 2.

DETAILED DESCRIPTION

Figure 1:
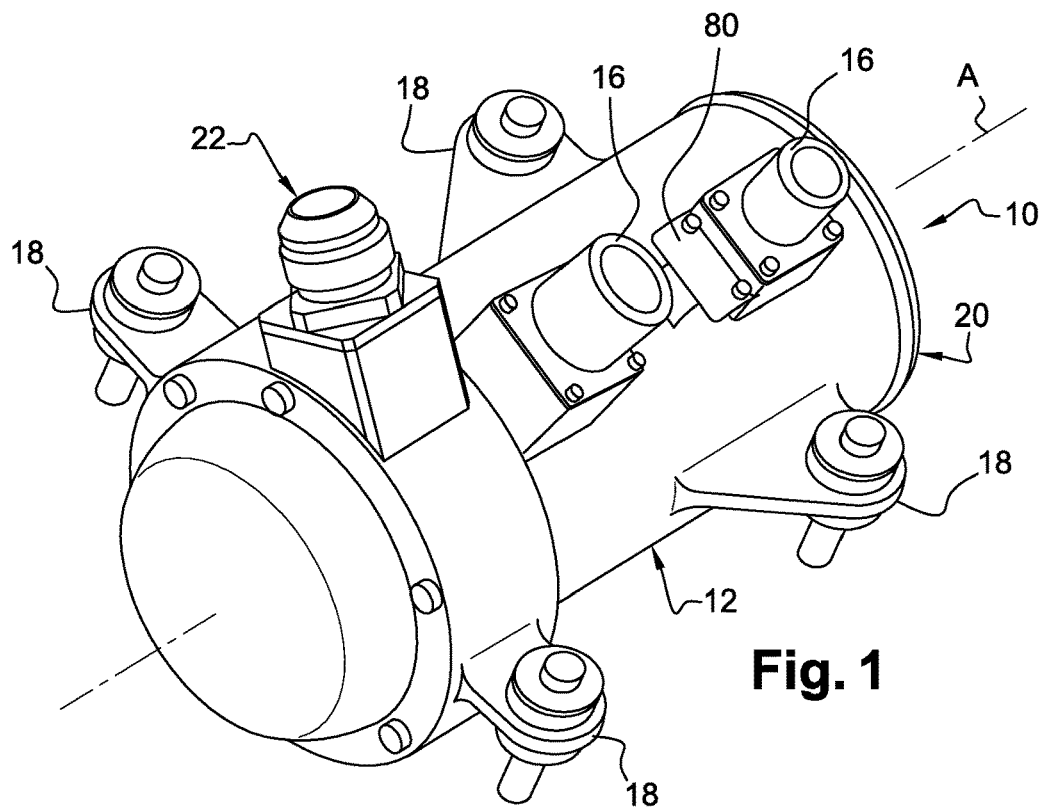
FIGS. 1 and 2 are schematic perspective views of an electric compressor according to the invention, shown respectively from the front and from the rear.
Figure 2:
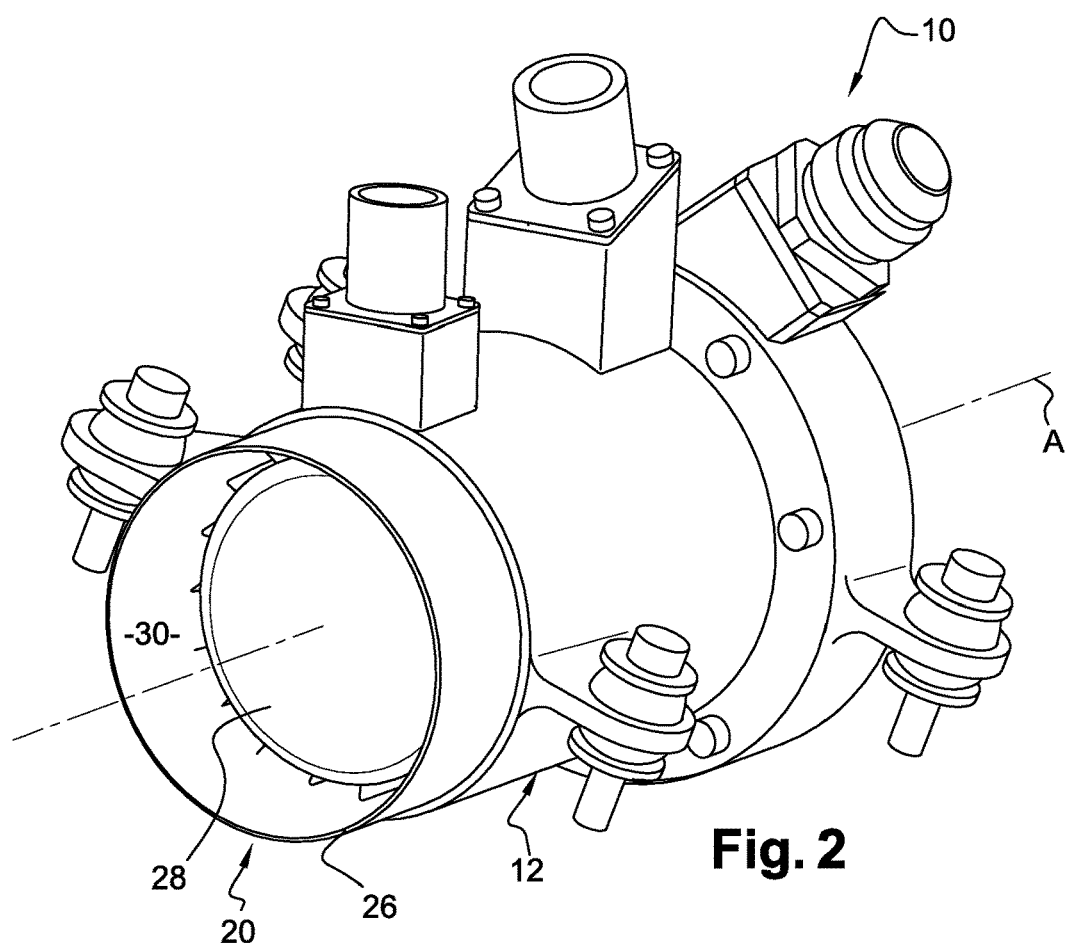

FIGS. 1 and 2 show an embodiment of the electric compressor 10 according to the invention, where the compressor 10 is used in the aeronautical sector, for example, to power a fuel cell or to pressurise the cabin of an aircraft.

Figure 3:
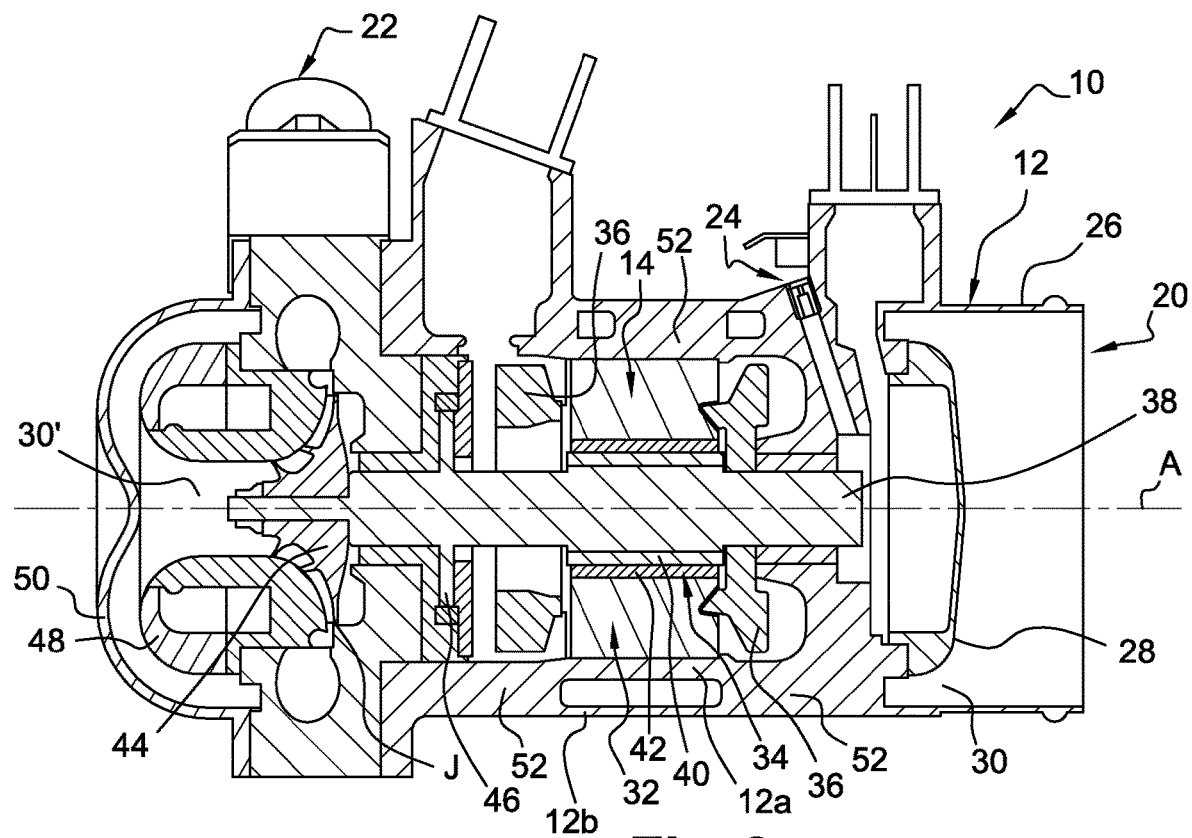
FIG. 3 is a schematic view of a longitudinal cross section of the compressor of FIGS. 1 and 2.

The compressor 10 includes a casing 12, inside which is mounted, in particular, an electric engine 14 shown in FIG. 3.

The casing 12 of the compressor has a general cylindrical shape along a rotational or longitudinal axis A.

The casing 12 includes electric connection terminals 16, used in particular to electrically power the engine, and in some cases, internal sensors.

The casing 12 includes side tabs 18 that feature through-holes for the attachment means, which is of the screw-nut type for example. The compressor 10 is thereby secured to an element of the turbine engine or of the aircraft by means of the tabs 18 of its casing 12.

The casing 12 defines a single air inlet 20 and a main compressed air outlet 22, and a secondary ventilation air outlet 24 shown in FIG. 3.

The air inlet 20 is axial and located at a longitudinal end of the casing, in this case at its rear end. Its cross section is circular in shape. At its rear end, the casing 12 features a cylindrical edge 26 along an axis A, that extends around a circular shielding 28 that is coaxial to the edge. The shielding 28 features an outer diameter that is inferior to the inner diameter of the edge 26, and defines with the latter an annular flow path 30 for the circulation of a first air flow that first cools the compressor, and then is supplied to it.

The main air outlet 22 features a substantially radial orientation with respect to the axis A. It is located in the vicinity of the front end of the casing, i.e. opposite the inlet 20.

The secondary air outlet 24 is shown in FIG. 3 and is described in further detail below.

Here, reference is made to FIG. 3. The electric engine 14 includes a stator 32 and a rotor 34. In the example shown, the stator 32 includes windings 36 that are secured inside the casing, substantially in the centre of the casing in its longitudinal direction. The rotor 34 includes a shaft 38 along the axis A that supports magnets 40 that are secured to the periphery of the shaft by means of a tubular collar 42.

Figure 4:
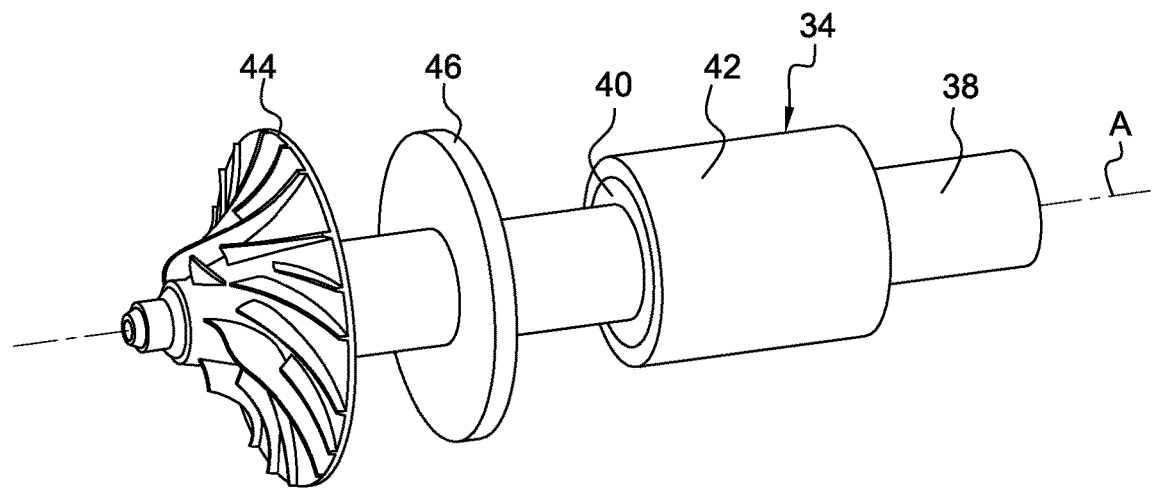
FIG. 4 is a schematic perspective view of the electric engine shaft of the compressor of FIGS. 1 and 2.

The shaft 38 is better seen in FIG. 4. It features an elongated shape along axis A, and includes, at its end, a centrifugal compressor impeller 44. In a known manner, the impeller 44 includes an axial inlet, in this case oriented towards the front, and an externally-oriented radial outlet.

The magnets 40 and the collar 42 are substantially located in the centre of the shaft, in its longitudinal direction. Between the impeller 44 and the magnets 40, the shaft features a radial annular collar 46.

As seen in FIG. 3, the rotor 34 extends along the greater portion of the longitudinal dimension of the casing 12. The impeller 44 is located in a transversal plane that intersects with the outlet 22 and is surrounded by an internal fairing 48 mounted inside the casing 12 and forming a volute intake. The fairing 48 is surrounded by another front shielding 50 secured to the casing 12 and that seals the front end of the compressor.

The casing 12 in this case is of the double skin type and features two cylindrical and coaxial skins, respectively an inner skin 12a and an outer skin 12b. The skins extend substantially over the entire longitudinal dimension of the casing 12. The edge 26 forms a rear extension of the outer skin 12b and the outer periphery of the front shielding 50 is configured to extend alongside the skin 12b. The outer periphery of the rear shielding 28 extends along the inner skin 12a, and the outer periphery of the fairing 48 extends along this skin. The fairing 48 features, in its centre section, a general C-shape and is located at a distance from shielding 50 such that the annular flow path 30 defined between the skins 12a, 12b is extended and diverted at a 180° angle to the inlet of the compressor impeller 44. The annular flow path 30 turns into a cylindrical flow path 30' inside the fairing 48. The fairing 48 surrounds the compressor impeller 44 with little clearance and defines with the latter a flow path, once again annular in shape, through which air is compressed and evacuated towards outlet 22.

The skins 12a, 12b are interconnected by fins 52. The compressor 10 can, for example, feature three annular rows of fins. The rows can be interspaced longitudinally and the fins of each row are preferentially evenly distributed about the axis A. The fins of the intermediate row are, in this case, arranged as a quincunx with respect to the fins of the front and rear rows.

A clearance J exists between the impeller outlet and the casing, i.e. between the outer periphery of the impeller and the casing. This clearing creates a leakage which, in this case, can be used to cool the bearings and prevents the presence of stagnant air therein.

The rotor 34 is rotationally driven inside the casing 12 by the bearings 54, 56, 58, of which there are three in this case. The bearings are configured to allow the circulation of air between the bearings and the rotor, along axis A, from the front to the rear. The bearings are, for example, foil bearings, i.e. they include metal foils that are inserted between the bodies of the bearings and the rotor.

FIG. 5 shows a rear part of the casing 12 that supports the bearing 54, also shown in FIG. 6. This bearing 54 includes a body that features a front tubular cylindrical wall 54a and a rear radial wall 54b. The body of the bearing is secured to the casing by screws, for example. The wall 54a features on its inner cylindrical surface an annular row of curved foils 60a that define a sliding surface of the corresponding portion of the shaft 38, and delimiting between them longitudinal air circulation channels 62b. The wall 54b features on its rear radial surface an annular row of flat foils 60b that define a radial sliding surface of the collar 46, and delimiting between them radial air circulation channels 62a.

The collar 46 is axially inserted between the wall 54b and the bearing 56 shown in FIGS. 7 and 3. The bearing 56 features a radial wall configured to be applied and secured to the bearing 54 and the casing. It features on its front radial surface an annular row of flat foils 60b that define a radial sliding surface of the collar 46, and delimiting between them radial air circulation channels 62a.

The rotor 34 is thereby supported axially inside the casing 12 by means of the bearings 54, 56 that surround axially its collar 46.

FIG. 9 shows a rear part of the casing 12 that supports the bearing 58, also shown in FIG. 8. The bearing 58 features a tubular cylindrical wall and includes on its inner cylindrical surface an annular row of curved foils 60a that define a sliding surface of the corresponding portion of the shaft 38, and delimiting between them longitudinal air circulation channels 62b. The bearings 54, 58 can be mounted by interference fit inside the casing.

Figure 10:
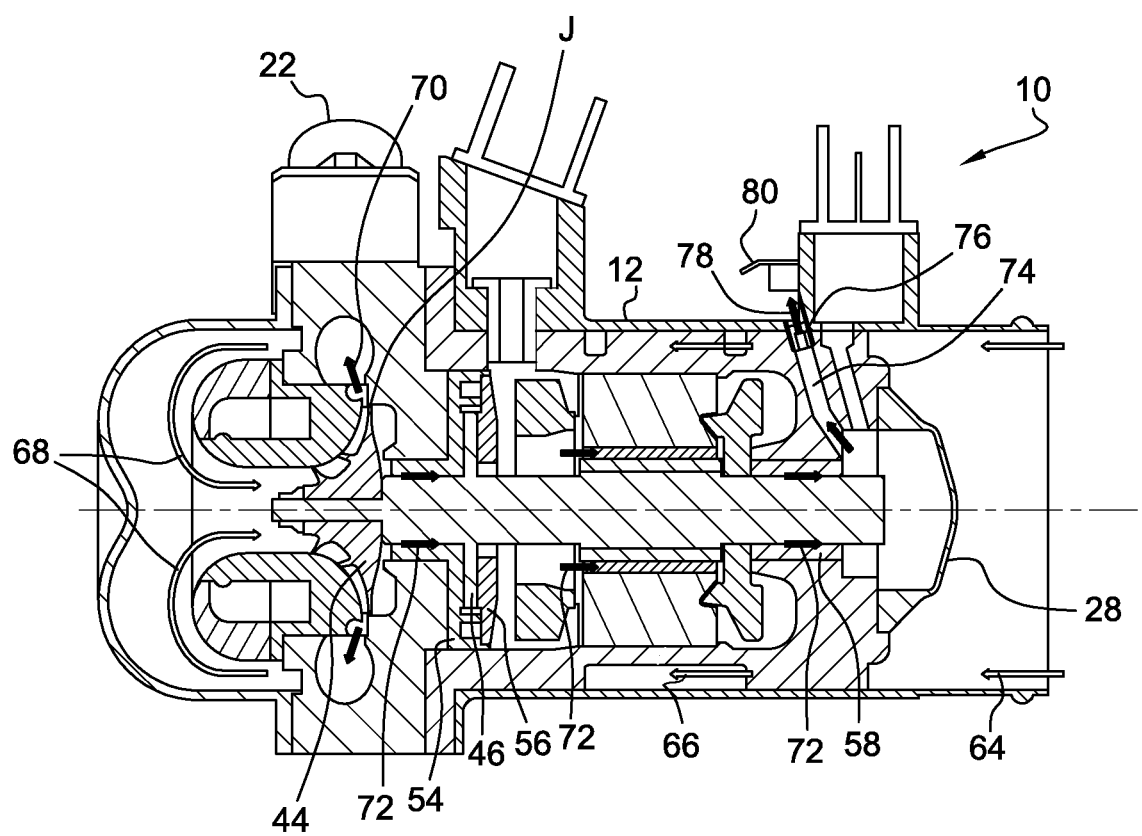
FIG. 10 is a view corresponding to that of FIG. 3 and showing the air flows inside the compressor.

FIG. 10 shows the circulation of the air flows inside the compressor 10. The arrows 64 show the incoming air flow in the compressor. This air flow arrives in the flow path 30 and creates an air flow 66 for the cooling of the compressor and of its stator in particular. It circulates between the skins 12a, 12b to the front shielding 50, where it is deviated to form an air flow 68 supplying the compressor impeller. The impeller 44 compresses the air flow 68 and supplies a flow of compressed air 70 that exits the compressor through a volute and then the outlet 22. The assembly of the impeller 44 inside the casing 12 is configured so that a calibrated leakage flow can occur at the outlet of the impeller 44 through the clearing J. This leakage flow creates a cooling air flow 72, in particular for the rotor, circulating between the rotor and the bearings 54, 56, 58, and more specifically through the abovementioned channels 62a, 62b. It should be understood that the air circulates:

first axially along the portion of the shaft 38 that extends between the impeller 44 and the collar 46,
then radially outwards along the front face of the collar,
then radially inwards along the rear face of the collar,
axially along the portion of the shaft 38 that extends between the collar 46 and the tubular collar 42,
axially between the tubular collar and the stator, and
axially along the portion of the shaft 38 located behind the tubular collar 42.

The cooling air then arrives at the rear end of the shaft 38, opposite the impeller 44. The casing 12 includes a discharge duct 74 that channels the air outside the compressor 10. In the example shown, the duct features a substantially radial orientation with respect to the axis A. Its radially inner end is located in the vicinity of the rear end of the shaft 38, and its radially outer end leads to an outer cylindrical surface of the casing 12.

A nozzle 76 is mounted at the radially external end of the duct 74 and is used to regulate the flow rate of the air flow discharge 78. This air is hot, and the rear shielding 28 is sealed so as to prevent the air from leaking and mixing with the incoming air flow or cooling air flow 64, 66.

As is seen in FIG. 10, the nozzle 76 is oriented so that the air flow 78 is directed towards a deflector 80. The deflector is formed by sheet metal secured to the casing and is configured to disperse the air flow and to slow it down. The sheet metal in this case features a free curved end, where its lower surface is configured to receive the impact of the air flow 78. The deflector 80 is also shown in FIG. 1.

The invention claimed is:

1. An electric centrifugal compressor comprising:
an electric motor, the stator of which is supported by a casing and the rotor of which includes a shaft mounted inside said casing, said shaft driving a centrifugal compressor impeller,
said casing having a double skin and comprising two substantially cylindrical, coaxial skins extending around said electric motor and defining between them an annular flow path for the circulation of a first cooling air flow, one inlet of which is located at a first longitudinal end of said shaft and an outlet of which is connected to a second longitudinal end of said shaft, which supports said centrifugal compressor impeller,
wherein said compressor includes means (J) for collecting a second air flow at the outlet of said centrifugal compressor impeller, means for channeling said second air flow along said shaft up to said first end, and means for discharging said second air flow out of said casing in order to prevent said second air flow from mixing with said first air flow.

2. The compressor according to claim 1, in which the outlet of said annular flow path is connected to an air inlet of said centrifugal impeller.

3. The compressor according to claim 2, in which said casing connects the outlet of said flow path to the air inlet of said centrifugal impeller.

4. The compressor according to claim 1, in which said compressor includes bearings intersected by said shaft and secured to the casing, whereby said second air flow being intended to circulate between the bearings and said shaft.

5. The compressor according to claim 4, in which said shaft includes a radial collar inserted between two radial walls of the bearings.

6. The electric centrifugal compressor according to claim 4 wherein the bearings comprise foil bearings.

7. The compressor according to claim 1, in which said discharge means includes a nozzle configured to regulate the flow of said second air flow.

8. The compressor according to claim 7, in which said casing includes or supports a deflector configured to disperse said second air flow.

9. The compressor according to claim 8, in which a shielding is mounted and sealed on the casing, at the level of said first end of said shaft, and is configured to prevent said first air flow from mixing with said second airflow.

10. A turbine engine, including the electric centrifugal compressor according to claim 1.

11. An aircraft, including the electric centrifugal compressor according to claim 1.

12. The aircraft according to claim 11 wherein the electric centrifugal compressor powers a fuel cell.

13. The aircraft according to claim 11 wherein the electric centrifugal compressor pressurizes an enclosure.

14. The electric centrifugal compressor according to claim 1 for a turbine engine.

15. The electric centrifugal compressor according to claim 1 for an aircraft.

16. A turbine engine including the electric centrifugal compressor according to claim 1, to power a fuel cell.

17. A turbine engine including the electric centrifugal compressor according to claim 1, to pressurize an enclosure.

18. A turbine engine of an aircraft, including the electric centrifugal compressor according to claim 1.

* * * * *